US006885299B2

(12) United States Patent
Cooper et al.

(10) Patent No.: US 6,885,299 B2
(45) Date of Patent: Apr. 26, 2005

(54) GEOPOSITIONABLE EXPENDABLE SENSORS AND THE USE THEREFOR FOR MONITORING SURFACE CONDITIONS

(76) Inventors: Guy F. Cooper, 484 Rancho Dr., Ventura, CA (US) 93003; John H. Williams, 1995 Ferndale Pl., Thousand Oaks, CA (US) 91360; Mark Leach, 9540 Telegraph Rd. #5, Ventura, CA (US) 93004; Dave J. Grace, 2714 Jill Pl., Port Hueneme, CA (US) 93041; William E. Vonwicklen, 4041 Oriole La., Oxnard, CA (US) 93030

( * ) Notice: Subject to any disclaimer, the term of this patent is extended or adjusted under 35 U.S.C. 154(b) by 0 days.

(21) Appl. No.: 10/196,646

(22) Filed: Jul. 16, 2002

(65) Prior Publication Data

US 2003/0218540 A1 Nov. 27, 2003

Related U.S. Application Data

(60) Provisional application No. 60/383,082, filed on May 24, 2002.

(51) Int. Cl.[7] ............................ G08B 1/08; H04Q 7/00; B64G 1/50

(52) U.S. Cl. ............................ 340/539.26; 340/539.13; 340/539.22; 244/163

(58) Field of Search ......................... 340/539.26, 539.1, 340/539.13, 539.22, 539.27, 539.28, 539.29, 870.1, 945, 981; 701/3; 455/431; 244/1 R, 163; 342/20

(56) References Cited

U.S. PATENT DOCUMENTS

| | | | | | |
|---|---|---|---|---|---|
| 4,654,528 | A | * | 3/1987 | Cloud et al. | 250/336.1 |
| 5,652,717 | A | * | 7/1997 | Miller et al. | 703/6 |
| 6,176,451 | B1 | * | 1/2001 | Drymon | 244/3.14 |
| 6,317,029 | B1 | * | 11/2001 | Fleeter | 340/10.32 |
| 6,380,889 | B1 | * | 4/2002 | Herrmann et al. | 342/357.09 |
| 6,480,115 | B1 | * | 11/2002 | Ghahramani | 340/815.4 |
| 2003/0066932 | A1 | * | 4/2003 | Carroll | 244/120 |

* cited by examiner

*Primary Examiner*—Donnie L. Crosland
(74) *Attorney, Agent, or Firm*—Christie, Parker & Hale, LLP

(57) ABSTRACT

A sensor system for monitoring for the presence of contamination with one or more contaminating biological, chemical and/or radioactive agents on a terrain surface, and creating a contamination map thereof. The sensor system includes a plurality of sensor pods, a ground station, an airborne dispensing portion, and an airborne monitoring portion. The sensor pods include a pod housing, a descent slowing airfoil, a detector unit for detection of the contaminating agent and outputting contaminating agent data, a processor for processing the contaminating agent data, a GPS unit for determining the position of the sensor, and a transmitter for transmitting contamination agent data and position data to the airborne monitoring portion. The airborne monitoring portion receives the transmitted data from the sensor pods, and relays the data to the ground station, where the contamination map is made available.

27 Claims, 13 Drawing Sheets

FIG. 1
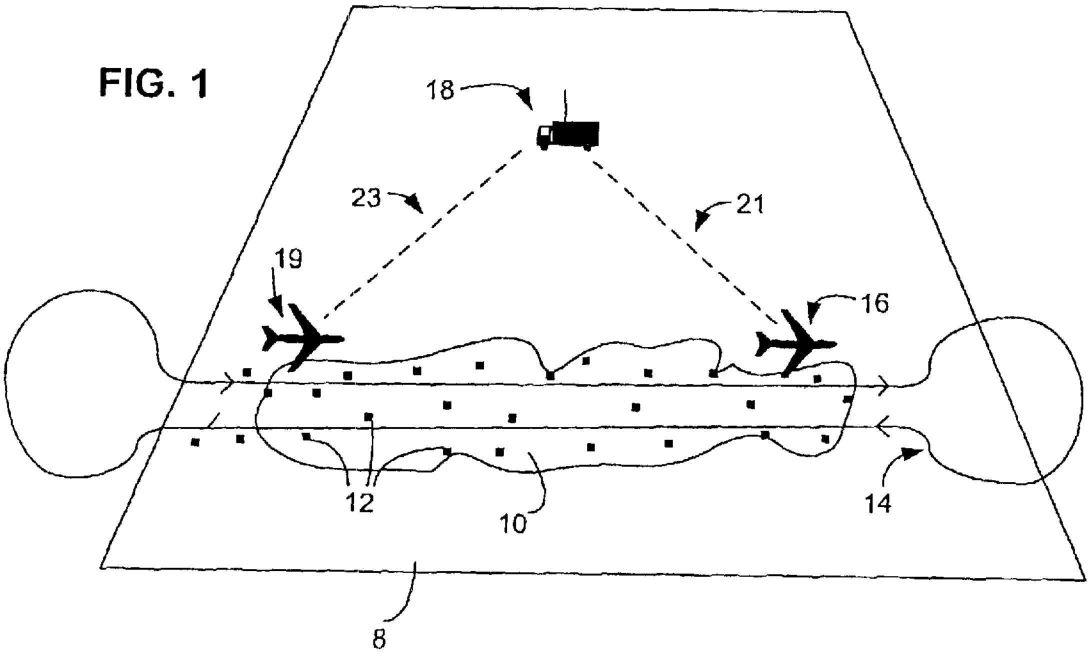
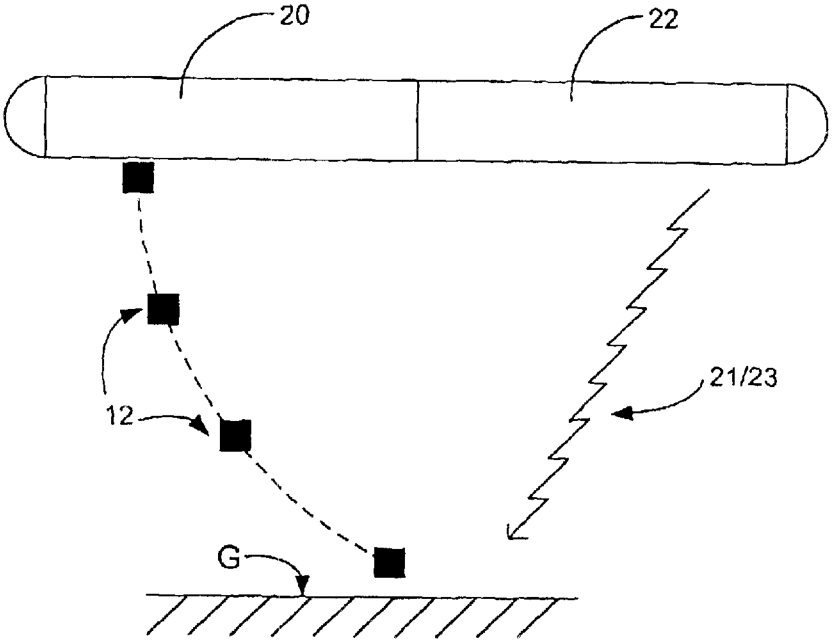
FIG. 2

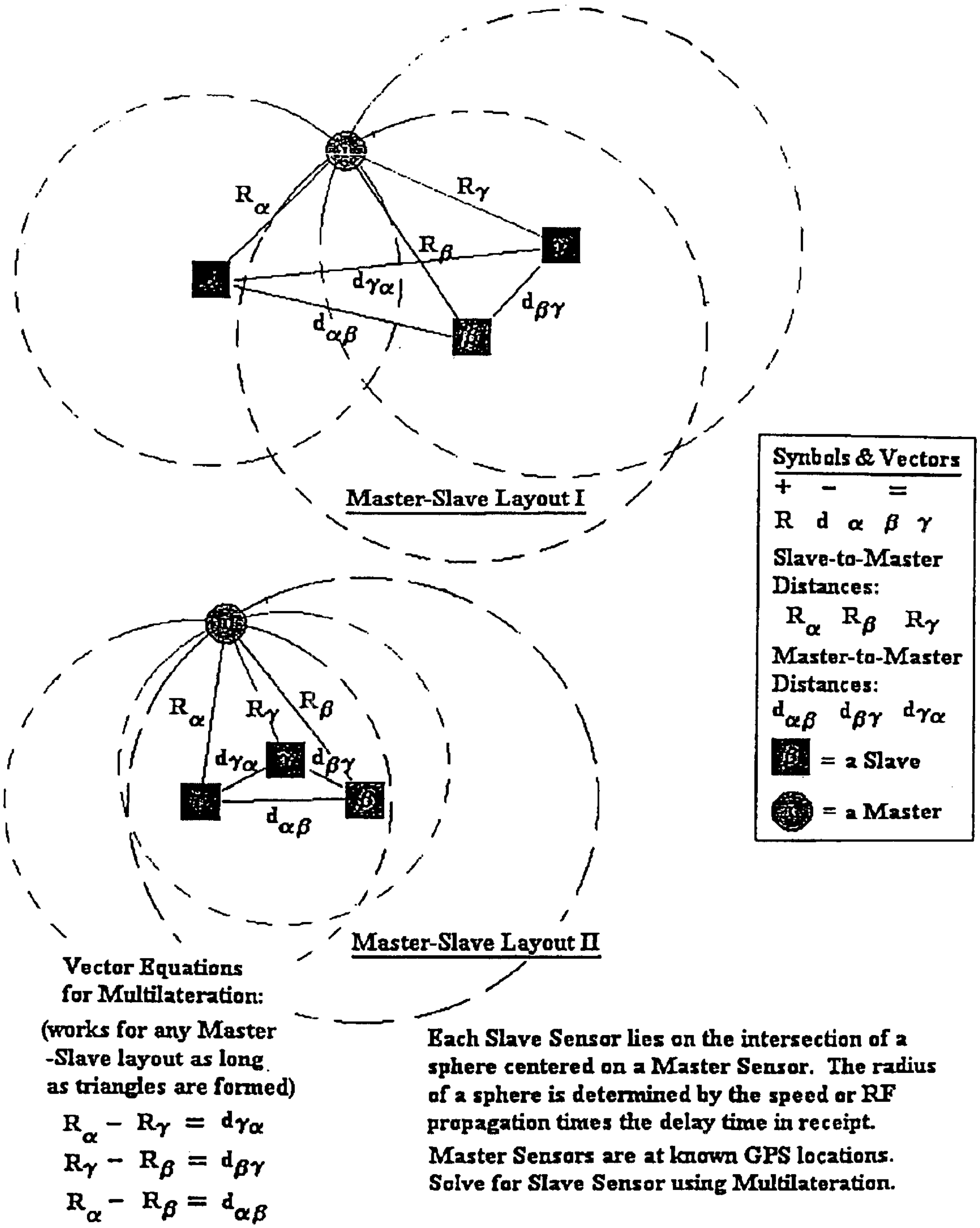

Vector Equations for Multilateration:

(works for any Master -Slave layout as long as triangles are formed)

$$R_\alpha - R_\gamma = d_{\gamma\alpha}$$
$$R_\gamma - R_\beta = d_{\beta\gamma}$$
$$R_\alpha - R_\beta = d_{\alpha\beta}$$

Each Slave Sensor lies on the intersection of a sphere centered on a Master Sensor. The radius of a sphere is determined by the speed or RF propagation times the delay time in receipt.

Master Sensors are at known GPS locations. Solve for Slave Sensor using Multilateration.

FIG. 11B

GEOPOSITIONABLE EXPENDABLE SENSORS AND THE USE THEREFOR FOR MONITORING SURFACE CONDITIONS

CROSS-REFERENCE TO RELATED APPLICATIONS

This utility patent application is based upon provisional patent application No. 60/383,082, filed May 24, 2002, with the same title "GEOPOSITIONABLE EXPENDABLE SENSORS AND THE USE THEREFOR FOR MONITORING SURFACE CONDITIONS."

BACKGROUND OF THE INVENTION

The invention relates to devices and systems for detecting trace materials associated with biological, chemical, or radioactive conditions on a terrain surface, as well as localized environmental conditions, including vibrations and radio emissions, and more particularly to expendable sensors with telemetry capabilities which can be dropped from an airborne platform and later monitored from that platform or another platform to determine conditions at the site where the sensors have been deposited and/or in the vicinity thereof.

There are numerous situations where it is desirable to map and monitor trace biological, chemical, radioactive agents, as well as localized environmental conditions on a surface, including vibrations and radio emissions, over a broad area of terrain from a standoff distance. For example, doing so can be useful for: 1. mapping for biological, chemical, and nuclear weapons material traces; 2. mapping illicit drug laboratory chemical traces; 3. mapping hazardous material spills; 4. locating drug farms hidden in forests; 5. mapping insect and plant disease infestations; 6. locating and monitoring insect, bird, animal, and plant species habitats; 7. tracking radio collars and gathering animal data; 8. mapping thermal plumes from power plants, volcanoes and geothermal wells; 9. locating lost hikers and avalanche-buried skiers using human detectors; and 10. tracking balloon borne air sensors. In many of these situations, the ability to rapidly deploy a plurality of such sensors and geoposition them, and quickly begin to gather data, is important.

SUMMARY OF THE INVENTION

The invention provides a system for detecting and geopositioning data samples of trace materials associated with biological, chemical, or radioactive conditions, as well as localized environmental conditions on a surface including vibrations and radio emissions utilizing a number of small, preferably inexpensive and expendable telemetering sensors, that are sown over a surface to be monitored by aircraft. The telemetered data signals avoid the problem of range attenuation (by the inverse range squared) of any radiation manifested by trace conditions being detected.

The sensor pods of the invention permit rapid geoposition mapping of trace biological, chemical, or radioactive warfare contaminant agents over large areas of terrain from a standoff distance. Other variables, such as sounds and vibrations, can also be detected. Thus, the sensor pod deploying platform, e.g. an aircraft or airborne pod, can be used to analyze a large area of terrain from a desired low, medium, high, or very high altitude. This analysis can be done quickly, and possibly as rapidly as a return flight over the area of dispensed sensor pods can be made, or by a second aircraft following the first aircraft.

Since the sensor pods are dispensed directly onto the surface, the sensing devices incorporated therein can have a lower sensitivity, be of a greater variety, and of lower cost than distant sensing devices. Thus, a large number of such sensor pods can be sowed over an area under surveillance. Increasing the number of sensor pods will result in a higher resolution map. In the case of monitoring for weapons of mass destruction (WMD) by a terrorist state or organization, an un-piloted drone could dispense such a large number that it would overwhelm the terrorist's ability to find and destroy all sensor pods. At the same time, if desired, the sensor pods can be used to communicate to the terrorists, criminal, or hostile enemy force that they are under close surveillance. Furthermore, each sensor pod is designed to performs its analysis, radiate its position, and telemeter its data soon after landing, and periodically or continuously thereafter, depending on the sensor pods' intended application(s).

BRIEF DESCRIPTION OF THE DRAWINGS

FIG. 1 is a diagrammatic view showing a site with trace contamination, sensor pods of the invention deposited along the site, a deploying aircraft flight path, an optional sensing aircraft flight path and a ground station.

FIG. 2 is a diagrammatic view showing a sensor pod dispensing platform dispensing the sensor pods, and receiving telemetered data from the sensor pods.

FIG. 11B is a diagrammatic view showing two master-slave layouts.

DETAILED DESCRIPTION OF THE INVENTION

Figure 3:
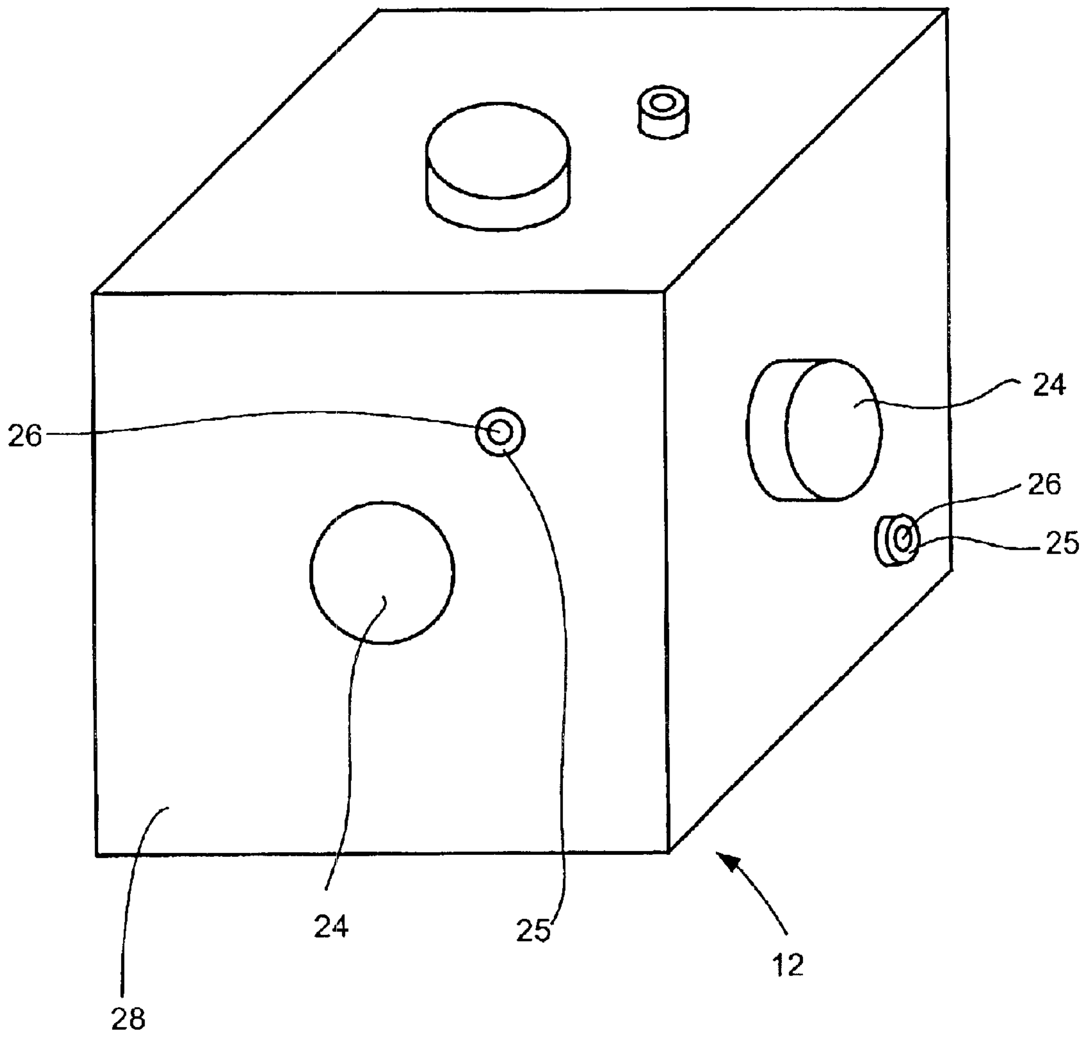
FIG. 3 is a perspective view of an embodiment of sensor pod with its multi-spectral beacon and data transmitter LED and with reagent chemical ports and fiber optics.

Referring to FIG. 1, there is shown a diagrammatic view showing a terrain site 8 with contamination 10 (be it chemical, biological, radioactive, etc.), a plurality of sensor pods 12 of the invention deposited along the site, a deploying aircraft flight path 14, a deploying aircraft 16, such as an airplane or helicopter, and a ground station 18. The sensor pods 12 are designed to detect the presence of trace biological, chemical, and/or radioactive warfare contaminant agents, sounds and other vibrations, and/or radio waves and other information concerning the site, and can be equipped with GPS so that they can telemeter precise location information along with the other data back to the deploying aircraft 16 or optionally to another aircraft 19 that follows, or even directly to the ground station 18. The ground station 18 can comprise a mobile command center such as a computer and receiving system carried on a truck or other mobile platform, a spotter on the ground equipped with a computer adapted to receive the data relayed from the sensor pods 12, and/or a permanent station, if desired. The deploying aircraft 16, which can be a manned or unmanned, will deploy a plurality of the sensor pods 12 along at least a portion of at least one leg of the flight path 14, and can, if desired, in a second, generally reverse flight path, locate the sensor pods 12 and receive the data transmitted therefrom. This data and the location of the sensor pods 12 can be transmitted to the ground station 18 where the data is processed to formulate a detailed map of the site mapped in terms of the measured conditions. The deploying aircraft 16 will carry a platform for collecting geopositions and analyzing data for use by the ground station 18 which is transmitted 21. Alternately, a second aircraft 19 can follow the deploying aircraft and monitor and transmit data 23 to the ground vehicle 18.

FIG. 2 is a diagrammatic view showing a sensor pod dispensing platform 20, e.g. carried on an aircraft (not shown), dispensing the sensor pods 12 which drop to the ground G. Either integral with the sensor pod dispensing platform 20, or as a separate unit, a telemetry receiving and transmitting unit (or airborne monitoring portion) 22 will collect data from the sensor pods 12 and then relay it to the ground station for processing via radio frequency or other frequency, light, microwave, etc., 21 or optionally process the data onboard. The airborne component can have an external store shell with a sensor pod dispenser; and also can have an integral sensor geopositioner, a telemetry receiver, and a sensor pod dispenser. The sensor pod dispensing platform 20 can be hung on a fixed wing aircraft, helicopter, or unmanned drone. Alternatively, if a follower aircraft 19 is used to monitor and/or process, the telemetry receiving and transmitting unit 22 could be carried on the follower aircraft 19.

FIG. 3 is a perspective view of an embodiment of sensor pod 12 with its multi-spectral beacon and data transmitter LEDs 24, and with reagent ports 25 and coaxial fiber optics 26, optionally coaxially disposed relative to each other. The sensor pod 12 has an outer case 28. The sensor pod 12 can be equipped with other sensing features as well. While the shape of the sensor pod 12 is shown as a generally box-shaped device, it can assume other shapes, such as spheres, ovoid structures, and other shapes. The LEDs 24 can have a combination of laser wavelengths individually unique to each sensor pod 12, and thereby unique to the GPS location where the sensor pods land, or can have a unique code which is transmitted from each LED. When the geopositioner on the aircraft detects this combination of laser wavelengths it assigns a digital code to this combination. This digital code then is matched with that sensor pod's omni-directionally broadcast digital identification code and data on any detected trace contamination agent. Detection of no contamination results in no digital data; but this is still useful in developing the contamination map in the ground station 18. The sensor pods 12 could possibly be made with a shell of transparent material so that all of the optical analysis of trace contaminants can be carried on through its surface.

Figure 4:
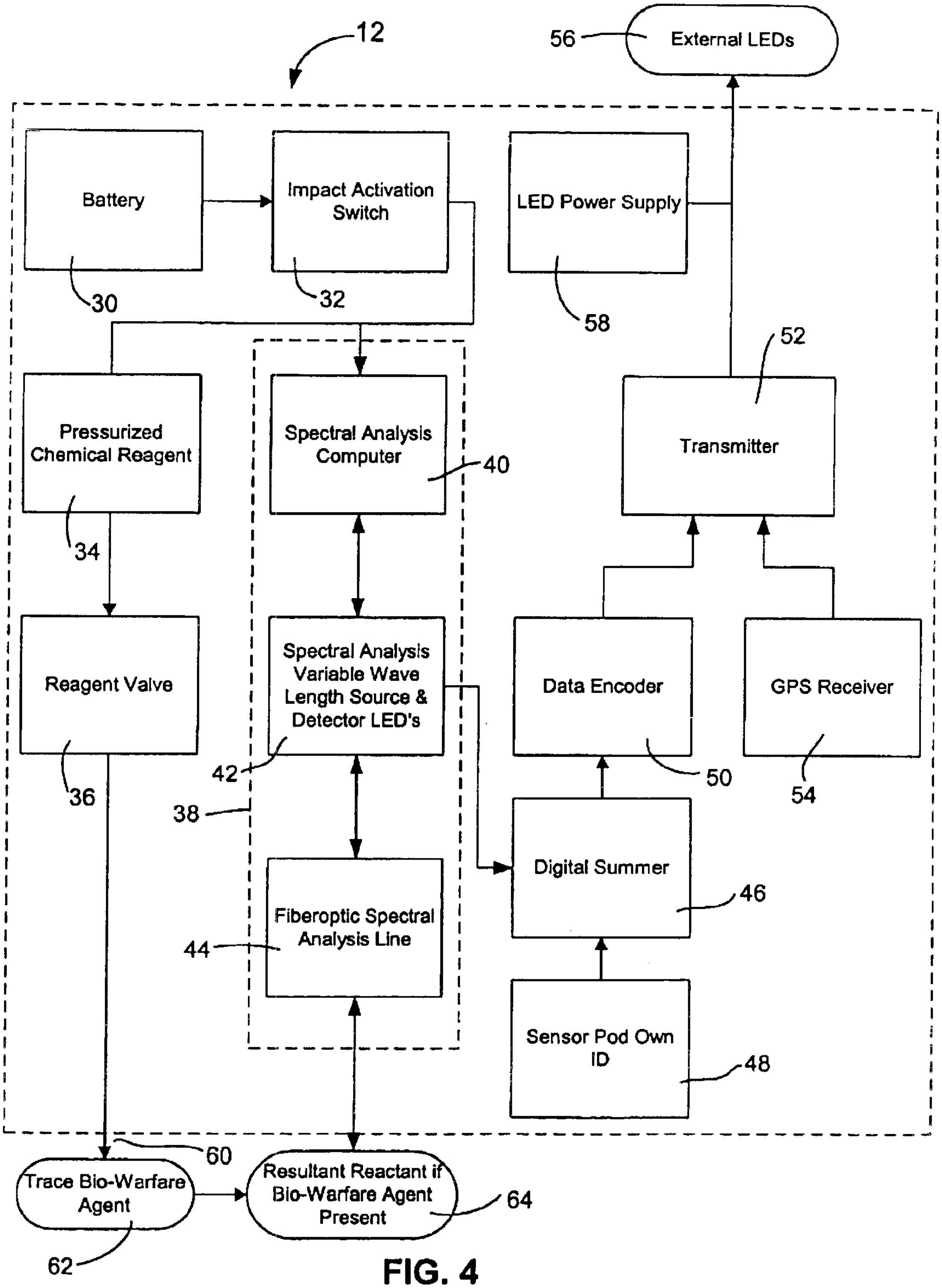
FIG. 4 is a diagram showing the internal systems of the sensor pod of FIG. 3, wherein external LEDs are used to transmit data.

Turning to FIG. 4, a diagram shows the internal systems of a sensor pod 12. The sensor pod 12 includes a power supply, such as a battery 30, an impact activation switch 32, and pressurized chemical reagent 34 and a reagent valve 36. Contained in a spectral analysis unit 38, there is a spectral analysis computer 40, a spectral analysis variable spectral source and detector LEDs 42 and a fiberoptic spectral line analyzer line 44. The spectral analysis computer 40 communicates with a digital summer 46, into which a sensor pod ID code 48 is loaded, and the data is further encoded by a data encoder 50. The data encoder 50 is connected to a transmitter 52. A global position system (GPS) recorder unit 54 is also connected to the transmitter 52, which uploads the data from the data encoder 50 and GPS receiver 54 to external LEDs 56. A separate LED power supply 58 can be provided to power the external LEDs 56. The external LEDs 56 act as multi-spectrum beacons and data transmitting LEDs.

In operation, the reagent valve 36 will release pressurized chemical reagent 60 onto the site. If the suspected trace bio-warfare agent 62 is where the chemical reagent 60 is sprayed, a resultant chemical reactant 64 will be detected by the fiberoptic spectral line analyzer 44 and the spectral analysis variable spectral source & detector LEDs 42. The present or absence (as well as strength of the presence of suspected trace bio-warfare agent 62) can thus be detected from the sensor pod 12, and uploaded by a monitoring aircraft 16 or 19.

Figure 5:
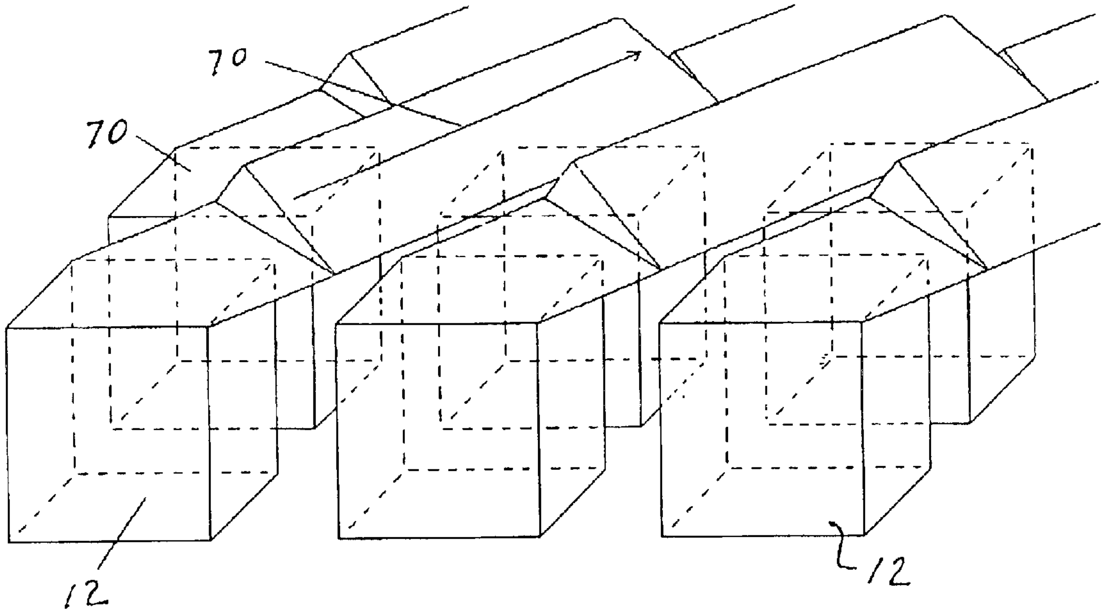
FIG. 5 is a perspective view showing a group of sensor pods with one embodiment of a descent control device affixed thereto.

Referring to FIG. 5, there is shown a perspective view of a plurality of sensor pods 12, equipped with wings 70 or gyro prop. The wings 70 can have a twist which makes the sensor pods 12 auto-rotate about its center of gravity and thereby slow its descent rate. A twisted blade or airfoil simulates one blade of an air propeller. This arrangement also facilitates close packing in the sensor pods 12 in the pod dispenser 20 prior to ejection (shown in FIG. 2). However, the longer the sensor pods 12 remain airborne, the more likely the sensor pods 12 will likely disperse off target, widening the footprint of pod distribution, particularly if there are any winds. The slow descent of the sensor pods 12 achieved with the gyro prop will minimize impact with the ground, and any resultant damage to sensor systems. In lieu of a single wing 70, multiple wings, parachutes, and other known means can be used to slow the rate of descent to help prevent possible damage to the sensor pods 12 when they impact the ground. Depending upon mission and wind conditions, the altitude of pod dispersion, and the number of pods available, will determine the size of pod distribution footprint and density of data points.

Figure 6:
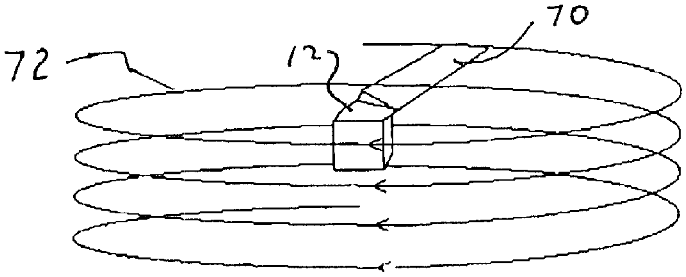
FIG. 6 is a diagrammatic view showing a sensor pod equipped with a descend control device descending to the ground.

FIG. 6 is a diagrammatic view showing the spiral descent pattern 72 of the sensor pod 12 equipped with a wing 70 of FIG. 5. The descent pattern and rate will depend upon the design of the wing 70, the weight and size and the sensor pod, the prevailing weather conditions, and other factors.

Figure 7:
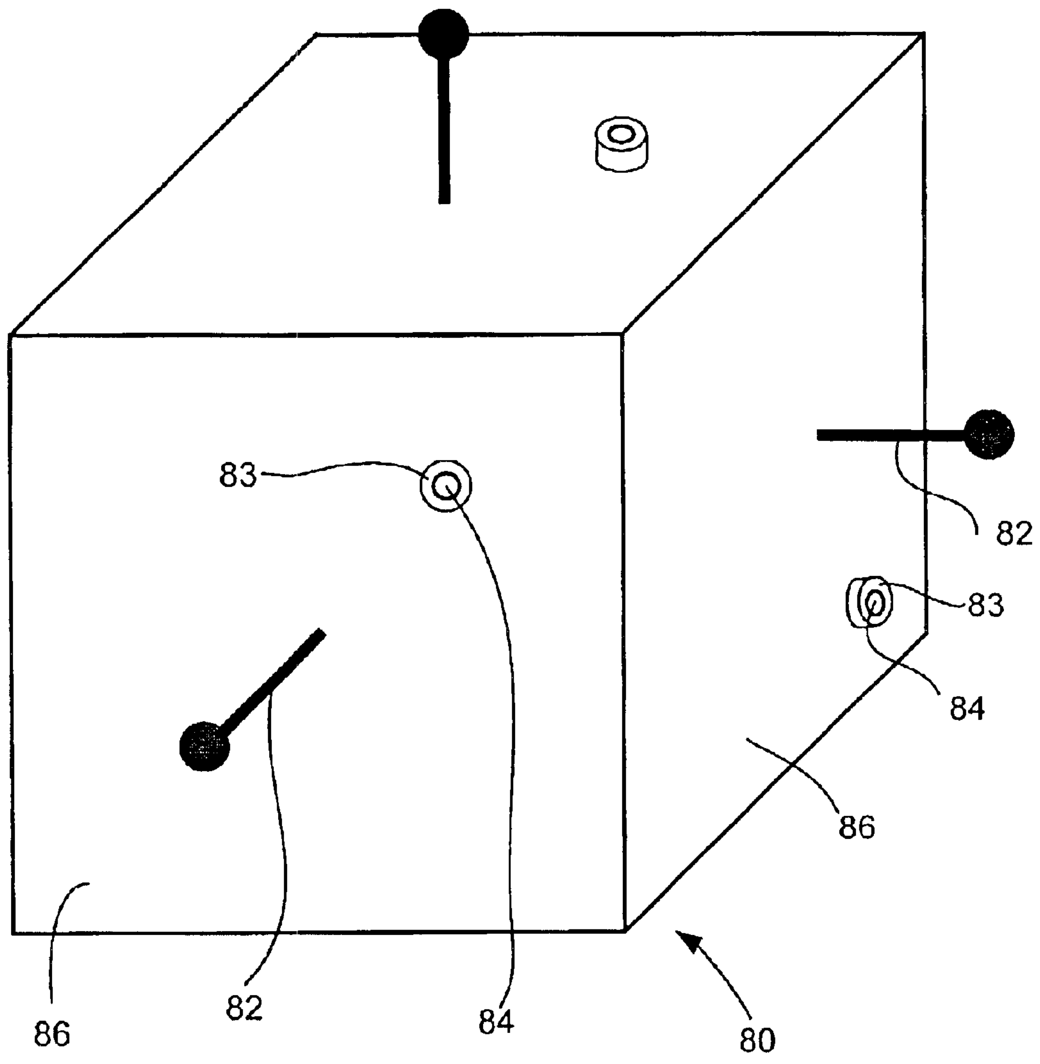
FIG. 7 is a perspective view of a second embodiment of a sensor pod with dipole antennas and with reagent ports and fiber optics.

FIG. 7 is a perspective view of a second embodiment of a sensor pod 80 with dipole antennas 82 and with reagent ports 83 and coaxial fiber optics 84 extending from exterior walls 86.

Figure 8:
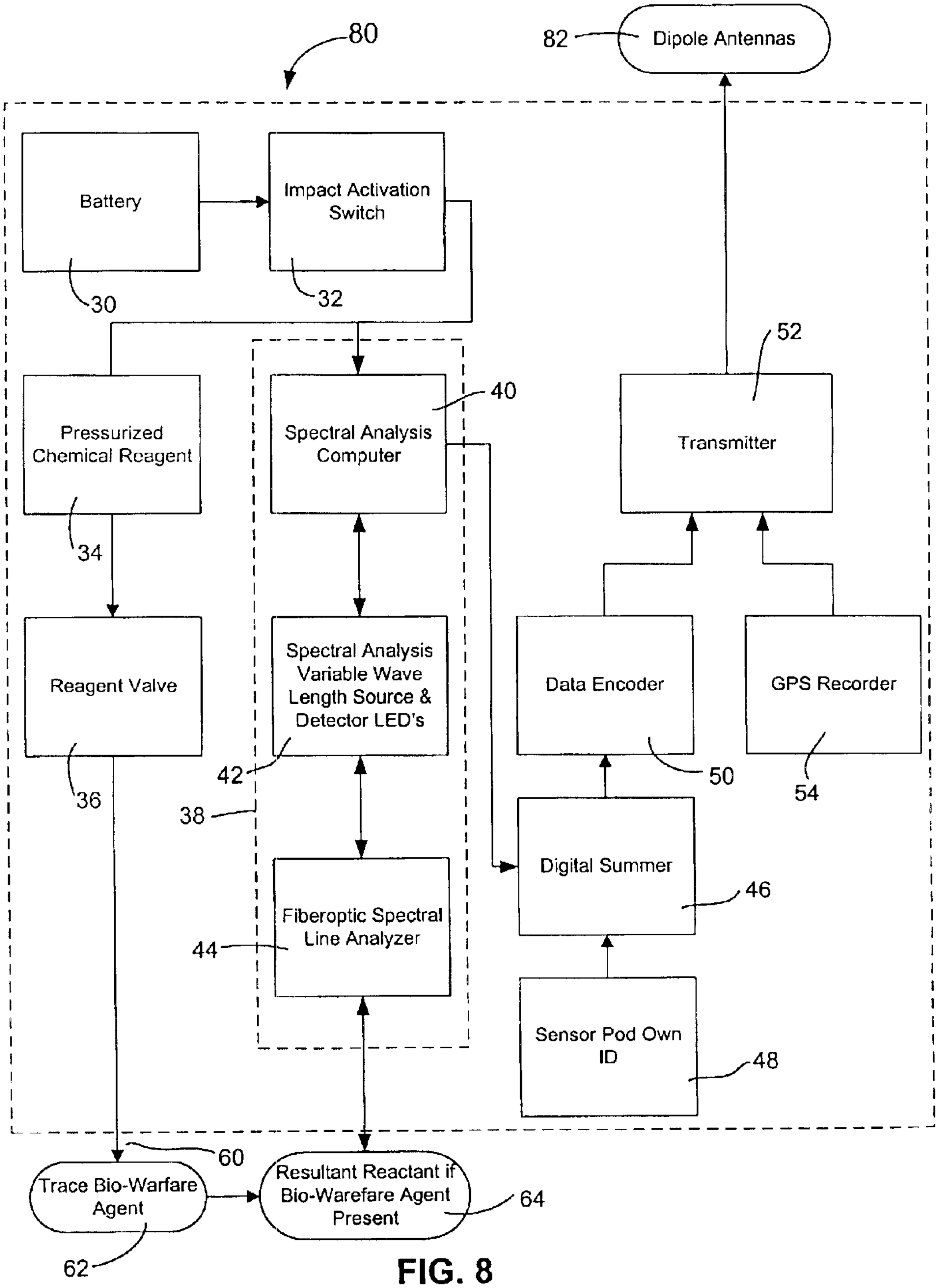
FIG. 8 is a diagram showing the internal systems of the second embodiment of the sensor pod of FIG. 7, wherein dipole antennas are used to transmit data.

FIG. 8 is a diagram showing the internal systems of the second embodiment of the sensor pod 80 of FIG. 7, wherein dipole antennas 82 which are extendable beyond the sides 86 of the sensor pod 80. The dipole antennas 82 preferable extend from all sides of the sensor pod 80, which in the case of a generally cubic shape require six antennas. The dipole antennas 82 are used to transmit data. In other respects, the sensor pod 80 is similar to the sensor pod 12 of FIGS. 3 and 4. The sensor pod 80 includes a power supply, such as a battery 30, an impact activation switch 32, and pressurized chemical reagent 34 and a reagent valve 36. Contained in a spectral analysis unit 38, there is a spectral analysis computer 40, a spectral analysis variable spectral source and detector LEDs 42 and a fiberoptic spectral line analyzer line 44. The spectral analysis computer 40 communicates with a digital summer 46, into which a sensor pod ID code 48 is loaded, and the data is further encoded by a data encoder 50. Encoder 50 can also encrypt data, if required. The data encoder 50 is connected to a transmitter 52. A global position system (GPS) recorder unit 54 is also connected to the transmitter 52, which uploads the data from the data encoder 50 and GPS receiver 54 to the dipole antennas 82. In lieu of dipole antennas, other known antennas can be used. The dipole antennas 82 act both as beacons, and to transmit the gathered data, and optionally, the identify of the sensor pod's own ID. As in the case of the first embodiment of the sensor pod 12, in operation, the reagent valve 36 will release pressurized chemical reagent 60 onto the site. If the suspected trace bio-warfare agent 62 is where the chemical reagent 60 is sprayed, a resultant chemical reactant 64 will be detected by the fiberoptic spectral line analyzer line 44 and the spectral analysis variable spectral source & detector LEDs 42. The present or absence (as well as strength of the presence of suspected trace bio-warfare agent 62) can thus be detected from the sensor pod 80, and telemetered to a monitoring aircraft 16 or 19.

On impact with the ground, the impact activation switch 32, which can comprise a simple accelerometer switch, connects the battery 30 with the system loads; it may also chemically activate the battery, in the case of long shelf life battery designs that need activation. The same impact switch 32 also opens the reagent valve 36 releasing a pressurized chemical or biological reagent 60 which wets the outside of the sensor surface 20 of FIG. 3. Here a chemical reaction takes place if the expected warfare agent is present.

Figure 9:
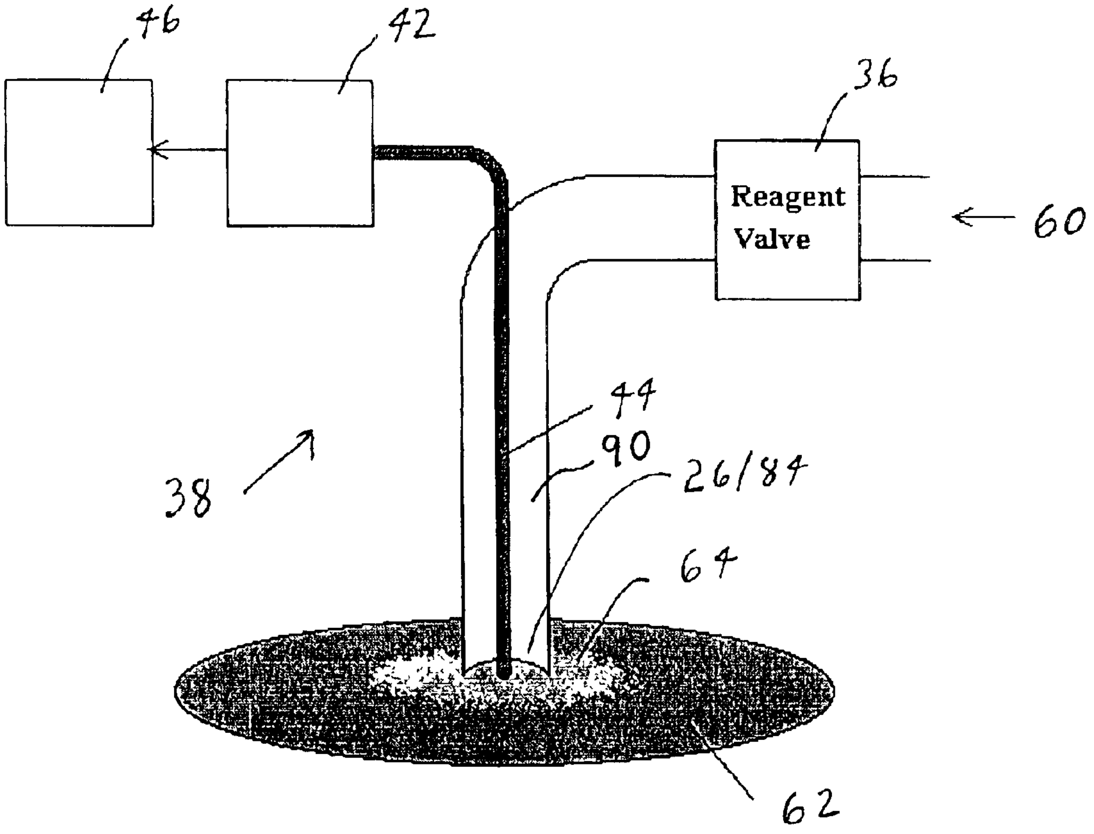
FIG. 9 is a view of a spectrograph analyzer detecting the present of a warfare agent.

FIG. 9 is a view of a spectrograph analyzer unit 38 detecting the presence of a trace bio-warfare agent 62. The fiberoptic spectral line analyzer 44 extends into the vicinity of the reagent outlet 26/28 through which the reagent supply 60 is dispensed through the reagent valve 36. Indeed, as shown in FIG. 9, the fiberoptic spectral line analyzer 44 can extend into a reagent line 90 and be exposed at the reagent outlet 26/28 to detect the presence of the resultant chemical reactant 64. The signal is processed by the spectral analysis computer 40 (not shown), and hence, the suspected warfare agent is detected.

Figure 10:
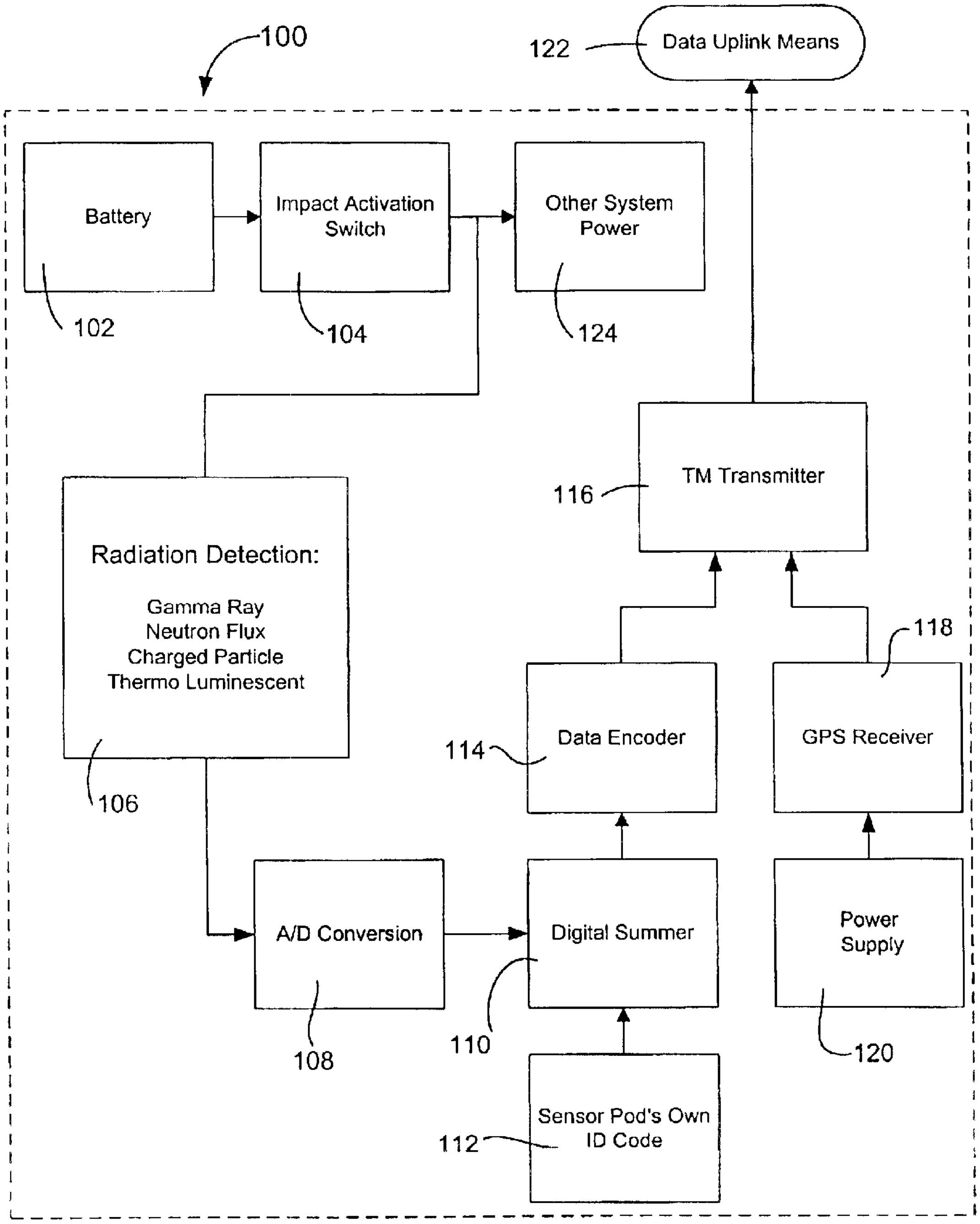
FIG. 10 is a diagram showing the internal systems of a third embodiment of a sensor pod for detection of radiation.

FIG. 10 is a diagram showing the internal systems of a third embodiment of a sensor pod 100 for detection of radiation. The radiation detecting sensor pod 100 includes a power supply, such as a battery 102, an impact activation switch 104, and a radiation detection unit 106, which can comprise a gamma ray detector, a neutron flux detector, a charged particle detector and/or a thermoluminescent detector, for example. The radiation detection unit 106 communicates with a A/D conversion unit 108, which in turn communicates with a digital summer 110. The sensor pod ID code 112 is optionally loaded into the digital summer 110, and the data is further encoded, and possibly encrypted, by a data encoder 114. The data encoder 114 is connected to a transmitter 116. A global position system (GPS) recorder unit 118 with a power supply 120 is also connected to the transmitter 116, which uploads the data from the data encoder 114 and the GPS receiver 118 to the transmitter 116, which data is uploaded by a data uplink means 122, which can comprise antennas, data LEDs, and the like.

The sensor pod 100 is equipped to detect and quantify radiation similar to that for detection of the warfare agents (biological and chemical materials) of the sensor pod designs of the first and second embodiments. The detection subsystem is different, however, being specific to detecting the several basic types of radiation (alpha, beta, gamma). Both the radiation detecting sensor pod 100 and the warfare agent sensor pods 12 and 80 typically have a very low data rate, because there is no rapidly time varying information once a specific radiation or agent is detected. Accordingly, the data detected does not need to be transmitted continuously.

Figure 11A:
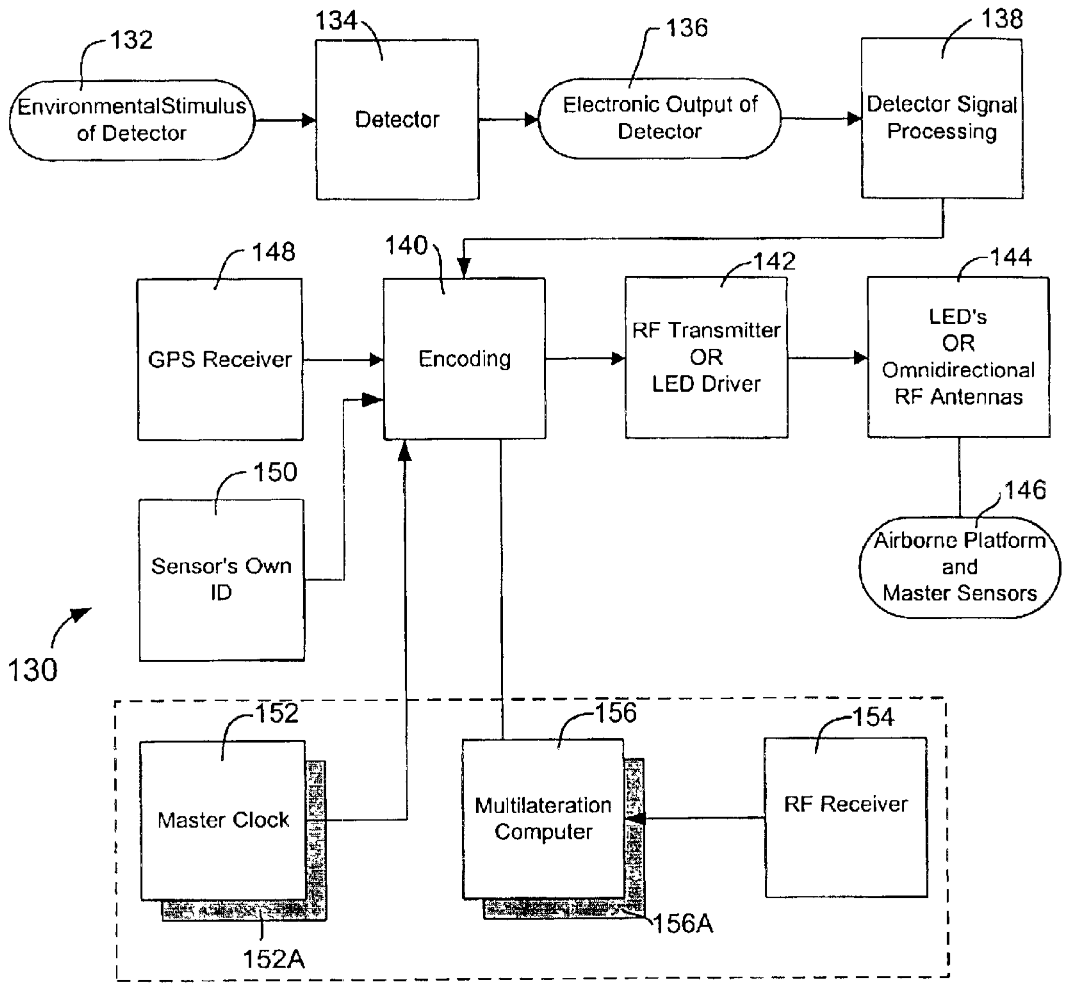
FIG. 11A is diagrammatic view showing information flow in a sensor pod of the invention.

FIG. 11 is a diagrammatic view showing information flow in a sensor pod of the invention, which can optionally be used in situations where there arc master sensor pods and slave sensor pods, with communication established between the slave and master sensor pods. As shown, there is environmental stimulus of the detector 132, which is picked up by the detector 134. There is an electronic output of the detector 136 followed by detector signal processing 138, which is then encoded 140. Location information from a GPS receiver 148 is fed to the encoder 140, as is optionally the sensor's own ID 150, and a time stamp from a master clock 152.

In situations with slave sensor pods, a slave clock 152A will send a time stamp to the encoder 140. A master sensor pod has a radio frequency receiver 154 which listens for slave pod RF broadcasts and receives their ID, time stamp, and data.

A slave pod may or may not have a GPS receiver 148. If a slave pod does not have a GPS receiver, then the system master pod uses its multilateration computer 156 to compute slave pod distances from itself by determining the respective RF transit time by comparing the slave pod data time stamp with its own master clock 152 time. The multilateration computer 156 then assembles a data and ID packet for each slave pod and attaches the computed slave pod distance stamp, plus its own ID and its own time stamp, and communicates this new larger data packet for each slave sensor pod to encoding 140. From encoding 140 a digital data stream is sent to RF transmitter or LED driver 142. From here the power-boosted signal is sent to LED's OR omni directional RF antennas 144 to be uploaded, or telemetered, to the airborne platform 146. In the case of the simpler slave sensor pod the simpler data packets are broadcast to the airborne platform and master sensors 146.

The airborne platform (16 or 19 from FIG. 1) then receives multiple sensor pod data packets, both from the slave sensor pods directly and also relayed through master sensor pods and master sensor pod data packets. The airborne platform 16/19 computer then uses the time tagged and distance tagged data packets to compute the GPS location of each master sensor pod and of each slave sensor pod. An alternate embodiment of this invention is for the airborne platform to geoposition each master sensor pod with its optical or RF directional seeker, and then to determine the relative geoposition of slave sensor pods relative to the master sensor pods. This is possible because each slave sensor pod's RF transmission will be received by two or more master sensor pods. There will be many more slave sensor pods than master sensor pods; the master sensor pods will ideally be distributed uniformly through the slave sensor pods.

The output of a single Slave Sensor, designated as Slave Sensor #i, is typical of all Slave Sensors, regardless of mission. It's bit stream, or, word packet, is repeatedly broadcast omni-directionally as digitally modulated FM. However, any of the conventional carrier modulation schemes could be employed, AM, PM, FSK, etc. A word packet contains that Sensor's ID, the Time from its precision clock that that word packet is formulated, and the actual sensed Data. The word packet has the following format:

$$ID_i\ Time_1\ Data_i \qquad (1)$$

A Master Sensor, designated at Master Sensor # α, generates its own word containing its own ID and sensed Data. To this the Master Sensor attaches all the Slave Sensor broadcast words that it has received, keeping their words intact with their own ID, Time, and Data. A super-word is formed, including the Time that the Master Sensor formulates it. Assuming that the Master Sensor α has received words from Slave Sensors i through n, the following super-word packet now resides in the Master Sensor:

$$ID_\alpha\ Time_\alpha\ Data_\alpha\ ID_i\ Time_i\ Data_1\ ID_j\ Time_j\ Data_j\text{- - - (k,l,m) - - - }ID_n\ Time_n\ Data_n \qquad (2a)$$

At this point the Master Sensor α can simply rebroadcast word (2a) omni-directionally to the Airborne Platform on its own carrier frequency; or it can perform some initial arithmetic as the first step in multilateration. This option consists of finding the time differences between its own precision clock Time and the Time attached to the word from each Slave Sensor. This second option results in the following word packet:

$$ID_\alpha\ Time_\alpha\ Data_\alpha\ ID_i\ (Time_\alpha\text{-}Time_i)\ Data_i\ ID_j\ (Time_\alpha\text{-}Time_j)\ Data_j\text{- - - (k,l,m) - - - }ID_n(Time_\alpha\text{-}Time_n)\ Data_n \qquad (2b)$$

The Airborne Platform receives either word packet format, (2a) or (2b) above, and proceeds to compute the Distance from each Master Sensor to all the Slave Sensors whose transmitted words are received by the respective Master Sensors. Because of the large number of Slave Sensors for the number of Master Sensors, most Master Sensors will receive the same word from a given Slave Sensor, but at different times due to different distances. This is necessary in order to perform the multilateration computation for geopositioning all the Slave Sensors. The first step performed on the Airborne Platform is to convert the respective Master-to-Slave Time Differences into Master-to-Slave Distances. This assumes that the Time Differences were calculated in the Master Sensors; if not, this is done on the Airborne Platform. The Distances are calculated using:

$$\text{Distance}=\text{Speed of Light}\times\text{Time Difference} \qquad (3)$$

In the Airborne Platform the first step uses equation (3), resulting in a word packet, which contains computed distances from Master Sensor α to each of the Slave Sensors j through n. This word packet also contains the computed geoposition (called $SGPS_\alpha$) of Master Sensor α, as detected by the Seeker on the Airborne Platform. The resultant word packet is:

$$ID_\alpha\ SGPS_\alpha\ Data_\alpha\ ID_i\ (Distance_{\alpha\text{-}1})\ Data_i\ ID_j\ (Distance_{\alpha\text{-}j})\ Data_j\text{- - - (k,l,m) - - - }ID_n\ (Distance_{\alpha\text{-}n})\ Data_n \qquad (4)$$

The next step in data processing onboard the Airborne Platform is to add the distances from the other Master Pods (arriving in word packets similar to word packet (4)) to the same Slave Pods.

FIG. 11B illustrates the geometry relating only Slave Sensor i to three Master Sensors, α, β, and χ. Doing the same thing for each Slave Sensor results in the following word packet:

$$ID_\alpha\ SGPS_\alpha\ Data_\alpha\ ID_\beta\ SGPS_\beta\ Data_\beta\ ID_\chi\ SGPS_\chi\ Data_\chi\text{- - - }ID_i\ (Distance_{\alpha\text{-}1})(Distance_{\beta\text{-}i})(Distance_{\chi\text{-}i})\ Data_1\text{- - - }ID_j\ (Distance_{\alpha\text{-}j})(Distance_{\beta\text{-}j})(Distance_{\chi\text{-}j})\ Data_j\text{- - - (k,l,m) - - - }ID_n\ (Distance_{\alpha\text{-}j})(Distance_{\beta\text{-}j})(Distance_{\chi\text{-}j})\ Data_n \qquad (5)$$

The final computational step onboard the Airborne Platform is the actual performance of multilateration. This is done by using all the distances from each Slave Sensor to each Master Sensor, and each Master Sensor's GPS (called SGPS), as given in word packet (5), to compute the geoposition of each Salve Sensor, called MGPS, where M stands for Multilateration. The resultant word packet is:

$$ID_\alpha\ SGPS_\alpha\ Data_\alpha\ ID_\beta\ SGPS_\beta\ Data_\beta\ ID_\chi\ SGPS_\chi\ Data_\chi\text{- - - }ID_i\ MGPS_i\ Data_i\ ID_j\ MGPS_i\ Data_j\text{- - - (k,l m) - - - }ID_n\ MGPS_n\ Data_n \qquad (6)$$

The last data processing step onboard the Airborne Platform is formulation of a final data word packet to be broadcast to the Ground Station receiver. This word packet consists of word packet (6) plus the addition of the Airborne Platform's own ID (in case there are other Airborne Platforms in the area), the time of formation of the word, and the Airborne Platform's own GPS (called $OGPS_{a/p}$). The outgoing data word packet is:

$$ID_{a/p}\ Time_{a/p}\ SGPS_{a/p}\ ID_\alpha\ SGPS_\alpha\ Data_\alpha\ ID_\beta\ SGPS_\beta\ Data_\beta\ ID_\chi\ SGPS_\chi\ Data_\chi\text{- - - }ID_i\ MGPS_i\ Data_i\ ID_j\ MGPS_i\ Data_j\text{- - - (k,l, m) - - - }ID_n\ MGPS_n\ Data_n \qquad (7)$$

The data in word packet (7) is used in the Ground Station computer to place data symbols at the correct locations on a digital map of the terrain being monitored.

Figure 12:
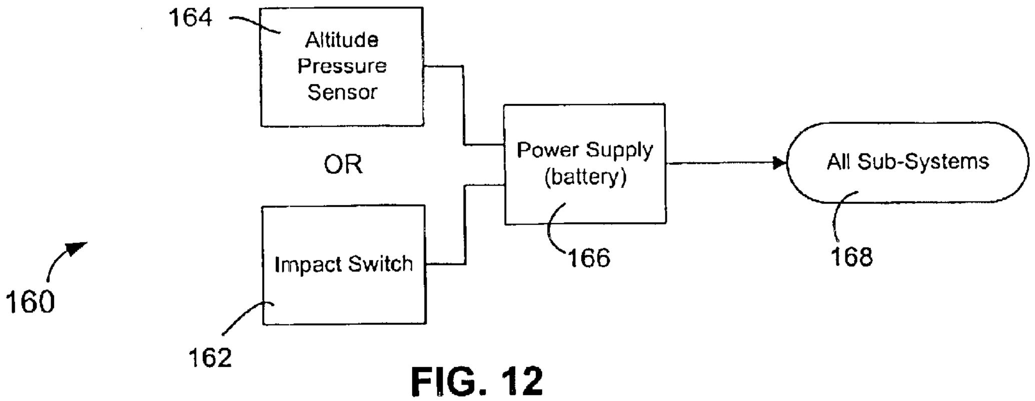
FIG. 12 is a diagrammatic view showing an impact/pressure turn on system of the invention.

FIG. 12 is a diagrammatic view showing an impact/pressure turn on system 160 of the invention. In lieu of an impact switch 162, an altitude pressure switch 164 could be utilized to activate a power supply 166, which then activates all sub-systems 168.

Figure 13A:
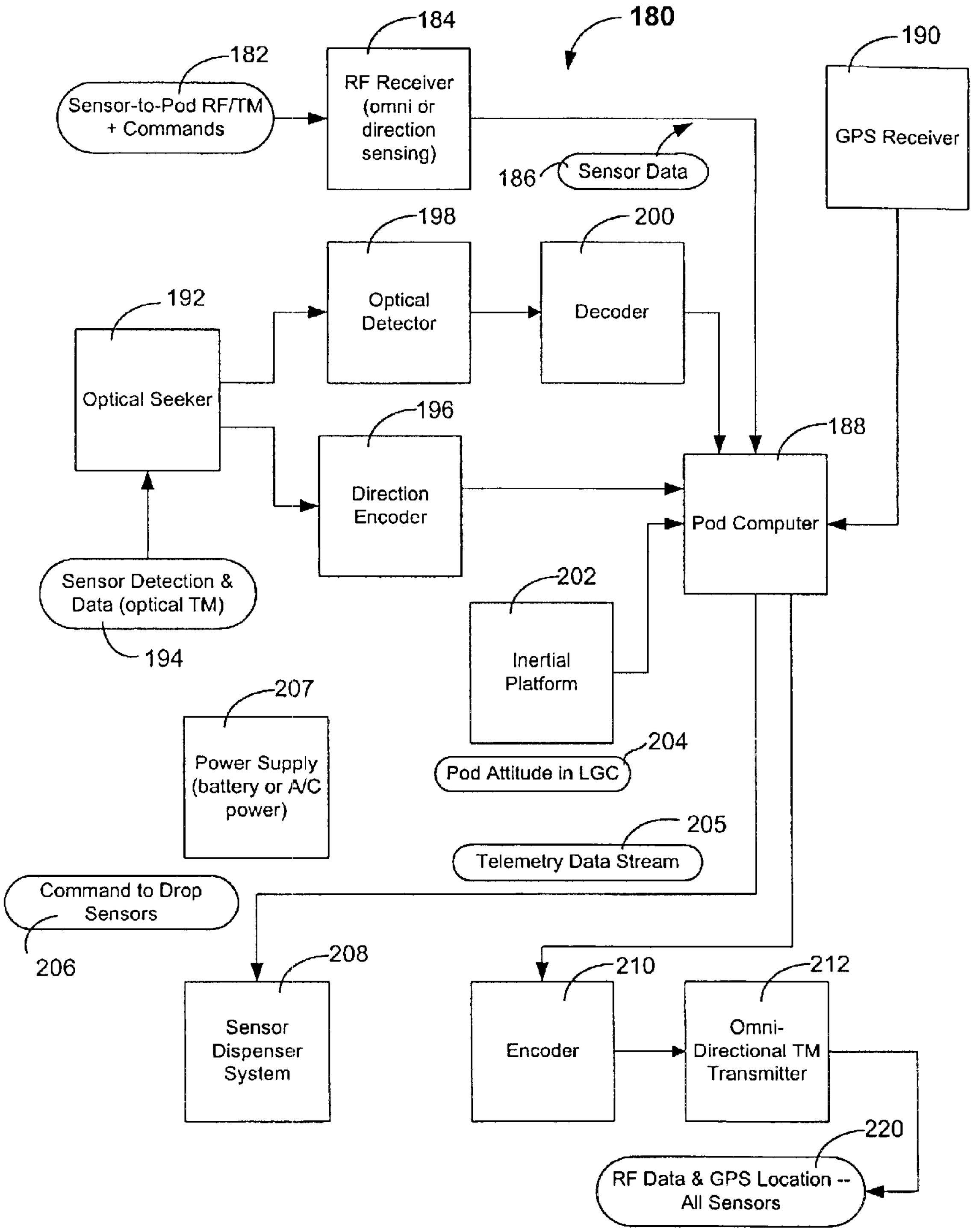
FIG. 13A is a diagrammatic view showing the system flow in the airborne airborne launch platform and tracking aircraft of the invention.

FIG. 13A is a diagrammatic view showing the system flow 180 in the airborne launch platform and tracking aircraft of the invention. The sensor-to-pod radio frequency transmitter and commands 182 is picked up by the RF receiver (omni or direction sensing) 184, and sensor data 186 is sent to the sensor pod computer 188. The GPS receiver 190 also sends position data to the sensor pod computer 188. The commands 182 come from the ground station and direct the airborne launch platform to launch sensors and to operate in various modes.

The optical seeker 192 scans and reflects all received optical energy into the optical detector 198 which registers the receipt of specific optical energy from the LED's. The direction encoder 196 sends concurrent azimuth and elevation direction data of the optical seeker 192 to the pod computer 188. The azimuth and elevation data is in the coordinate system of the airborne launch platform. Inertial platform 202 data, pod attitude in LGC 204, consists of the pod's attitude (yaw, pitch, and roll) in the local geocentric centric (LGC) coordinate system which is fed to the pod computer 188.

The Decoder (200) detects coded data from the optical encoder 198 which consists of the data sensed by the sensor on the ground, and passes it to the pod computer 188.

Optically coded data passing through block 198 is an alternate source of sensor data to the RF coded data passing through block 184. Either sensor data routes may be utilized, or both in conjunction. The fully equipped airborne launch platform would have both systems and could launch/dispense either or both types of sensors.

In the pod computer 188 the following input data is used to geoposition the sensors on the ground: GPS data from block 190; azimuth and elevation data from block 198 and optionally from block 184 (if the RF Receiver 184 is direction sensing); and airborne platform attitude data from block 202. In an embodiment of the invention, a method of geopositioning a sensor on the ground can involve the vector algebra contained in U.S. Pat. No. 6,281,970, the disclosure of which is incorporated herein by reference.

Pod computer 188 also receives the data from each sensor (from block 198 and/or block 184) and associates each sensor ID and its data with its computed geoposition. It formats this complete data for transmission in encoder 210 which then sends it to the omni-directional TM transmitter 212 for transmission to the ground station. Pod computer 188 also receives commands from the ground station through the RF receiver 184 which direct it to drop sensors from the sensor dispenser system 208.

Power supply 207 generates and provides conditioned electrical power to all components of the Airborne Launch Platform. It may consist of a battery, parent aircraft power, or a wind driven generator/alternator.

Figure 13B:
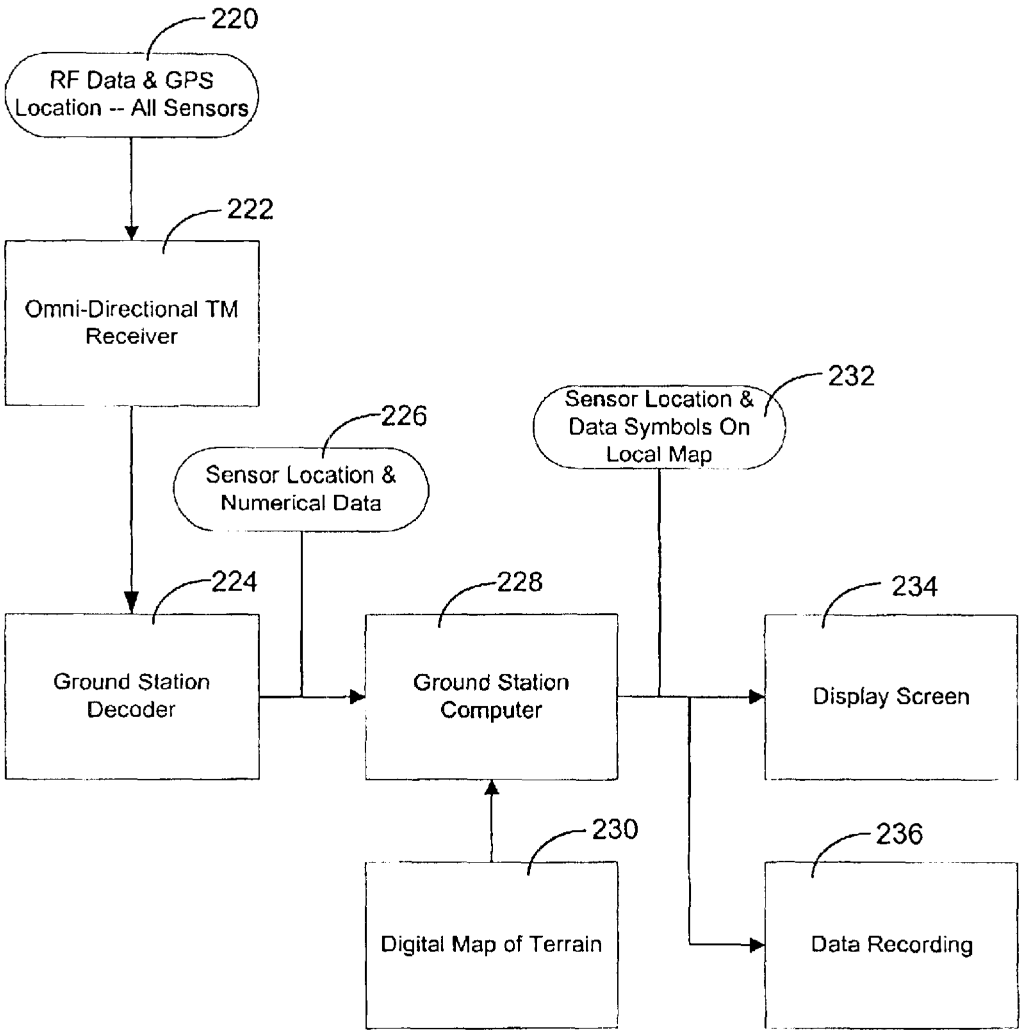
FIG. 13B is a diagrammatic view showing the system flow in the airborne launch platform and tracking aircraft and ground station.

FIG. 13B is a diagrammatic view showing the system flow in the airborne launch platform and tracking aircraft and ground station.

The block, RF data and GPS Location for all sensors, 220 is broadcast by the airborne launch platform to an omni-directional TM receiver 222 feeding the ground station decoder 224 with data from all detected and geopositioned sensors. This data, identified as sensor location & numerical data 226, goes to the ground station computer 228. A digital map of terrain 230 contains a description of the local terrain. In the ground station computer 228 the GPS locations of all sensors is superimposed on the local terrain map. In addition, the detected data from each sensor is indicated by an appropriate symbol indicting type of data and magnitude of data for that GPS location. Ground station computer 228 also can have software to draw contour lines, interpolating between the data points, as desired by the ground station personnel. Further, local meteorological data can be added to the final map. The map is then displayed on the display screen 234. Ground station personnel can operate mode switches to display the types of information they desire. All computer output data is also stored on data recording 236 for archiving and for RF data transmission to other remote locations, such as state and federal agencies.

Figure 14:
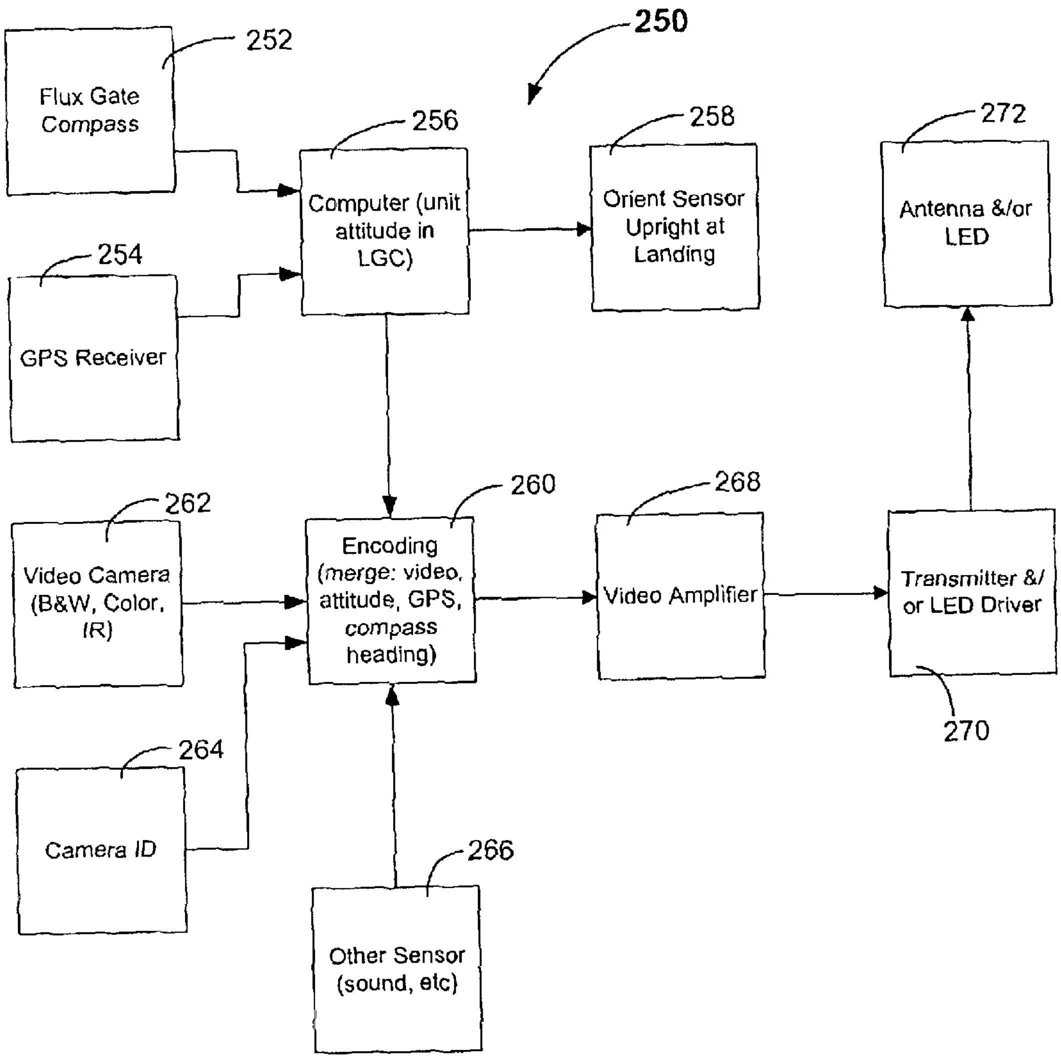
FIG. 14 is a diagrammatic view showing another embodiment of the sensor pod of the invention equipped with image, sound, or other sensors.

FIG. 14 is a diagrammatic view showing another embodiment of the sensor pod of the invention equipped with camera, sound, or other sensors. In contrast to the radiation detecting sensor pod 100 and the warfare agent sensor pods 12 and 80, the video camera sensor pod 250 must have the capacity for telemetering rapidly time varying real time scene changes.

The sensor pod 250 must know its own location and heading in order that the video scenes it takes are useful to ground station personnel. To do this, it knows its heading from the flux gate compass 252, and its location from the GPS receiver 254. Computer 256 uses this information plus an internal vertical attitude sensor (a mercury switch or other approximate attitude sensor) to formulate digital data which goes into encoding 260 which formulates the total telemetry data stream for that sensor. Should the sensor 250 land in an attitude upside down or on its side, the orient sensor upright at landing 258 receives commands from the computer 256 to upright the sensor 250. Various mechanisms can be used to affect the upright attitude. One possibility is that the entire sensor 250 has an outer transparent spherical shell within which the unit slides by gravity to the bottom position where it is automatically upright. A more advanced position could also swing it in azimuth to point at some pre-set GPS position from wherever it may land. Upright stance, and compass heading, are known by computer 256, which ceases commanding the orient sensor block 258 when the proper vertical and heading attitude is achieved.

Video camera 262 (which can be black and white, color, or IR, depending upon the cost and mission of the sensor) feeds digitized image information to encoding 260. In addition, the camera ID 264 of that sensor and other sensor 266 data is also fed to encoder 260 to form the total digital data stream to be telemetered by RF or by LED. This digital data stream will be very high frequency, particularly to handle real time video images. Thus, a wide band video amplifier 268 is required. The amplified digital data stream power is used to modulate the Transmitter &/or LED Driver 270 carrier signal which drives the Antenna &/or LED 272 output which is omni-directional, so as to be received by the Airborne Platform flying anywhere in the vicinity.

Other sensor 266 can consist of a sound microphone, which normally is used with a surveillance video camera. It can also contain vibration sensors to detect movement of tanks, trucks, etc., or even some chemical or nuclear radiation detection, depending upon the cost and mission of the system.

In the operation of the system, some sensor pods 12, 80, 250 may not land on any trace contamination agent. Others may fail to function, and/or may land in locations where they cannot be located and geopositioned from an aircraft receiving the data. However, those sensor pods 12, 80, 250 that do detect trace surface contamination and can be located by the aircraft's geopositioner unit then have useable mapping data on the nature of the contamination they encounter. The sensor information is digitized and can be added to the sensor pod's digital identification code to form a digital word that is encoded and can be broadcast as an omni-directional signal to be received by the aircraft. The omni-directional signal is either a modulated optical signal, or a modulated RF signal. The aircraft geopositions the sensor pod and adds the computed GPS location of that sensor pod to its received digital signal. This entire digital word for each sensor pod (now with the pod's ID, its computed GPS position, its sensed contamination data, and also IRIG time) is telemetered by RF down to the ground station 18. At the ground station 18 the sensor pod data can be overlain on a digital map of the area being examined as the data is received from the sensor pods. Thus, the contamination map, with intensity and chemical (or other species) contours, can be populated with data as rapidly as the aircraft flies its return path over the area of sown sensor pods or by another/other aircraft which follow.

As noted above, a problem inherent in airborne spectrographic detection of very dilute trace substances (such as biological and chemical warfare materials) on the ground from an aircraft a mile or more above is the inverse square law of radiation attenuation with distance. At very close ranges, such spectrographic emission can be achieved by scanning with a high irradiant pulsed laser to cause vaporization, or by lower energy specific laser wavelengths to cause fluorescence. These methods methodologies cannot be practically employed by very distant aircraft. In the system of the invention, the problem of range attenuation can be bypassed by dispensing many inexpensive telemetering sensor pods onto the surface being studied. In the invention, each sensor pod 12 can autonomously do a variety of tests and the results telemetered back to the dispensing aircraft, and/or any other data-handling center. Alternatively, a number of sensor pods dedicated to a single particular test can be deployed.

Each sensor pod 12, 80, 250 is geopositioned by the airborne dispenser aircraft so that the data from each may be entered real-time on a map of the terrain being monitored. Each sensor pod 12, 80, 250 has its own unique identification code (in the form of both a unique combination of discrete laser wavelengths, and/or as a digital RF signal, both omni-directional), so that its code, GPS location, and the sensor data combine to form a digital data word. The stream of these telemetered digital words plus the GPS location, permits real time overlay of the data on a digital map of the area under surveillance. By employing a large number of low cost sensor pods, a high-resolution map of the sensed contamination information can be generated quickly and accurately.

The sensor pods can be continuous geopositioned so that real-time mapping of the data they sense can be achieved. This is achieved by an inertially stabilized directional detector of the omni-directional LED beacon emanations from each sensor pod. Each sensor pod's individual GPS location can then be computed by triangulation from the airborne geopositioner/dispenser using the its own GPS location.

Depending upon cost, size, complexity, and battery life, each sensor pod 12 may have its own GPS receiver. Here, an all RF version telemeters all data, including GPS location, and no directional location of a beacon LED is done by the airborne platform.

An all-optical version would involve the optical beacon LED being digitally pulse coded for further sensor pod discrimination. The sensor pod's data can be digitally encoded on its optical beacon LED as a back up to, or instead of, the RF coding.

In a modification, rather than all airborne components being in the self-contained external sensor pod dispensing platform 20, they could be distributed within an aircraft; and could even use some of the aircraft's own systems (such as the GPS receiver, power, TM transceiver, and dispenser chute). A separate aircraft or drone could do the sensor pod dispensing, at an earlier time (with a time delay, or an RF activation signal). Further, map integration of the resultant data could be done in a third large remote surveillance and command aircraft serving as the "Ground Station", so no actual ground facility would be required in hostile territory.

The variety of sensor functions is possibly limitless, depending upon the intended mapping function mission of the system. Virtually any of the present sensor technologies could be used if miniaturization and low cost expendability is emphasized.

Because of their low cost, small size, and large number, it is possible that floating sensor pods could substitute for, or complement, the present use of sonobouys in oceanographic and pollution surveillance. Surface temperature and chemical-optical data would be telemetered back to form drift maps; possible because of the near real time generation of data over large areas of the surface.

The present invention covers the modifications and variations of this invention provided they come within the scope of the appended claims and their equivalents. In this context, equivalents means each and every implementation for carrying out the functions recited in the claims, even those not explicitly described herein.

What is claimed is:

1. A sensor system for monitoring for the presence of contamination with one or more contaminating biological, chemical and/or radioactive agents on a terrain surface, and creating a contamination map thereof, comprising:

(a) a plurality of sensor pods, comprising, a detector unit for detection of the contaminating agent and outputting contaminating agent data, comprising a chemical reagent which is released from the sensor pod and reacts with contamination at the terrain surface to form a reactant, and a spectral analysis unit which quantifies the reactant and the level of contamination measured, a processor for processing the contaminating agent data, a geopositioning mechanism for determining the position of the sensor, and a transmitter for transmitting contamination agent data and position data; and (b) an airborne dispensing portion for dispensing the plurality of sensor pod to the terrain surface, and (c) an airborne monitoring portion for receiving the transmitted contamination agent data and position data from the plurality of sensor pods.

2. The sensor system of claim 1, wherein each sensor has an identification code which is transmitted by the transmitter to the airborne monitoring system.

3. The sensor system of claim 1, further comprising a ground station, and wherein the airborne monitoring portion further comprises a transmitter for transmitting data from the airborne platform to the ground station, the ground station compiling a detailed map of the terrain surface in terms of its contamination characteristics.

4. The sensor system of claim 1, wherein the sensor pod further comprises a descent slowing mechanism.

5. The sensor system of claim 4, wherein the descent slowing mechanism comprises an airfoil.

6. The sensor system of claim 1, wherein the sensor pod further comprises, an activation switch for activating the sensor pod when the sensor pod reaches the terrain surface.

7. The sensor system of claim 1, wherein the airborne dispensing portion and the airborne monitoring portion are separate, self contained and detachably attachable units carried on different aircraft.

8. The sensor system of claim 1, wherein the detector unit comprises a radiation detector unit.

9. The sensor system of claim 1, wherein the transmitter for transmitting contamination agent data and position data to the monitoring system comprises at least one LED.

10. The sensor system of claim 1, wherein the transmitter for transmitting contamination agent data and position data to the monitoring system comprises at least one RF antenna on the sensor pod.

11. The sensor system of claim 1, wherein the airborne dispensing portion and the airborne monitoring portion are self contained and detachably attachable to an aircraft.

12. The sensor system of claim 1, wherein the geopositioning mechanism comprises a global positioning system.

13. A sensor system for monitoring for the presence of contamination with one or more contaminating biological, chemical and/or radioactive agents on a terrain surface, and creating a contamination map thereof, comprising:

(a) a plurality of sensor pods, comprising, a detector unit for detection of the contaminating agent and outputting contaminating agent data, a processor for processing the contaminating agent data, a geopositioning mechanism for determining the position of the sensor, and a transmitter for transmitting contamination agent data and position data;

(b) an airborne dispensing portion for dispensing the plurality of sensor pod to the terrain surface, and (c) an airborne monitoring portion for receiving the transmitted contamination agent data and position data from the plurality of sensors, wherein each sensor has an identification code which is transmitted by the transmitter to the airborne monitoring system, and wherein at least one of the plurality of sensor pods is a master sensor pod which includes a RF receiver, and at least one of the plurality of sensor pods is a slave sensor pod which includes a RF transmitter for transmitting the at least one slave sensor pod's identification code, the slave sensor pod's contamination agent data, and a time stamp of the slave sensor, which master sensor pod then uplinks the data from the slave pod and its own data to the airborne monitoring system.

14. The sensor system of claim 13, wherein at master sensor pod further includes a multilateration computer to compute the at least one slave pod's distance from the master pod.

15. The sensor system of claim 13, wherein the geopositioning mechanism comprises the data transmitted to the airborne platform, which airborne platform uses an optical or RF directional seeker to determine the relative geoposition of the master sensor.

16. A sensor system for monitoring for the presence of contamination with one or more contaminating biological, chemical and/or radioactive agents on a terrain surface, and creating a contamination map thereof, comprising:

(a) a plurality of sensor pods, comprising, a pod housing, a descent slowing mechanism on the pod housing, a detector unit for detection of the contaminating agent and outputting contaminating agent data, the detector unit comprising a chemical reagent which is released from the sensor pod and reacts with contamination at the terrain surface to form a reactant, and a spectral analysis unit which quantifies the reactant and the level of contamination measured, a processor for processing the contaminating agent data, a geopositioning mechanism for determining the position of the sensor, and a transmitter for transmitting contamination agent data and position data;

(b) a ground station;

(c) an airborne dispensing portion for dispensing the plurality of sensor pods to the terrain surface, and (d) an airborne monitoring portion for receiving the transmitted contamination agent data and position data from the plurality of sensors, and a transmitter for transmitting the contamination agent data and position data from the plurality of sensor pods to the ground station.

17. The sensor system of claim 16, wherein the airborne dispensing portion and the airborne monitoring portion are separate, self contained and detachably attachable units carried on different aircraft.

18. The sensor system of claim 16, wherein the sensor pod further comprises an activation switch for activating the sensor pod when the sensor pod reaches the terrain surface.

19. The sensor system of claim 16, wherein the airborne dispensing portion and the airborne monitoring portion are self contained and detachably attachable to an aircraft.

20. The sensor system of claim 16, wherein the detector unit comprises a radiation detector unit.

21. The sensor system of claim 16, wherein the transmitter for transmitting contamination agent data and position data to the monitoring system comprises at least one LED on the sensor pod.

22. The sensor system of claim 16, wherein the transmitter for transmitting contamination agent data and position data to the monitoring system comprises at least one RF antenna on the sensor pod.

23. A sensor pod for monitoring for the presence of contamination with one or more contaminating biological, chemical and/or radioactive agents on a terrain surface, and creating a contamination map thereof, comprising:

a pod housing;

a descent slowing mechanism on the pod housing;

a detector unit for detection of the contaminating agent and outputting contaminating agent data;

a chemical reagent which is released from the sensor pod and reacts with contamination at the terrain surface to form a reactant;

a spectral analysis unit which quantifies the reactant and a level of contamination measured;

a processor for processing the contaminating agent data;

a geopositioning mechanism for determining the position of the sensor; and a transmitter for transmitting contamination agent data and position data.

24. The sensor pod of claim 23, wherein the sensor pod further comprises an activation switch for activating the sensor pod when the sensor pod reaches the terrain surface.

25. The sensor pod of claim 23, wherein the detector unit comprises a radiation detector unit.

26. The sensor pod of claim 23, wherein the transmitter for transmitting contamination agent data and position data to the monitoring system comprises at least one LED on the sensor pod visible from the pod housing.

27. The sensor pod of claim 23, wherein the transmitter for transmitting contamination agent data and position data to the monitoring system comprises at least one RF antenna.

* * * * *